(12) United States Patent
Sutter et al.

(10) Patent No.: US 10,706,635 B2
(45) Date of Patent: *Jul. 7, 2020

(54) SYSTEM AND METHOD FOR PRESENTING PLACARDS IN AUGMENTED REALITY

(71) Applicant: The Toronto-Dominion Bank, Toronto (CA)

(72) Inventors: Levi Sutter, Westampton, NJ (US); Miguel Navarro, Ewing, NJ (US)

(73) Assignee: The Toronto-Dominion Bank, Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,024

(22) Filed: Oct. 4, 2019

(65) Prior Publication Data

US 2020/0105067 A1 Apr. 2, 2020

Related U.S. Application Data

(63) Continuation of application No. 16/145,365, filed on Sep. 28, 2018, now Pat. No. 10,482,675.

(51) Int. Cl.
*G06T 19/00* (2011.01)
*G06Q 30/02* (2012.01)
*G06F 40/58* (2020.01)

(52) U.S. Cl.
CPC ............ *G06T 19/006* (2013.01); *G06F 40/58* (2020.01); *G06Q 30/0261* (2013.01)

(58) Field of Classification Search
None
See application file for complete search history.

(56) References Cited

U.S. PATENT DOCUMENTS

| 8,644,842 | B2 | 2/2014 | Arrasvuori et al. |
| 8,733,927 | B1 | 5/2014 | Lewis |
| 9,092,674 | B2 | 7/2015 | Andrade et al. |
| 9,230,367 | B2 | 1/2016 | Stroila |

(Continued)

OTHER PUBLICATIONS

Nazri et al.: "A mobile augmented reality game design approach for on product advertising"; Source: ACM International Conference Proceeding Series, Nov. 16-19, 2015, Nov. 16, 2015, ACE 2015—12th Advances in Computer Entertainment Technology Conference, Proceedings; ISBN-13: 9781450338523 DOI: 10.1145/2832932. 2856222.

(Continued)

*Primary Examiner* — Frank S Chen
(74) *Attorney, Agent, or Firm* — Rowand LLP

(57) ABSTRACT

A computer-implemented method for presenting placards in augmented reality includes receiving, from a mobile computing device via a network, an indication of an image of at least a portion of a first placard captured in an environment. A placard matching the indication is then identified in a data store storing information related to a plurality of placards. Images of further placards related to the matching placard are retrieved from the data store. Based on configuration data, one of the images of further placards is selected. The selected one of the images of further placards for display in augmented reality is sent to the mobile computing device via the network. Other related methods, systems, and computer-readable media are also disclosed.

18 Claims, 10 Drawing Sheets

(56) References Cited

U.S. PATENT DOCUMENTS

| | | |
|---|---|---|
| 9,390,561 B2 | 7/2016 | Brown et al. |
| 9,519,640 B2 | 12/2016 | Perez et al. |
| 9,547,644 B2 | 1/2017 | Cuthbert et al. |
| 9,547,938 B2 | 1/2017 | Ramkumar et al. |
| 9,652,690 B2 | 5/2017 | Eid et al. |
| 9,685,004 B2 | 6/2017 | Wang et al. |
| 9,762,817 B2 | 9/2017 | Osman |
| 9,818,150 B2 | 11/2017 | Rhoads et al. |
| 9,928,655 B1 | 3/2018 | Alston |
| 9,971,768 B2 | 5/2018 | Murthy et al. |
| 2007/0015118 A1 | 1/2007 | Nickell et al. |
| 2011/0170740 A1 | 7/2011 | Coleman |
| 2012/0330646 A1 | 2/2012 | Andrade et al. |
| 2012/0122570 A1 | 5/2012 | Baronoff |
| 2013/0222670 A1 | 8/2013 | Lin |
| 2013/0246094 A1 | 9/2013 | Cruise |
| 2013/0250119 A1 | 9/2013 | Xu |
| 2013/0317912 A1 | 11/2013 | Bittner |
| 2014/0111542 A1 | 4/2014 | Wan |
| 2014/0152677 A1 | 6/2014 | Martinik |
| 2014/0172701 A1 | 6/2014 | Pandhare |
| 2014/0188756 A1 | 7/2014 | Ponnavaikko et al. |
| 2014/0298383 A1 | 10/2014 | Jo et al. |
| 2015/0123966 A1 | 5/2015 | Newman |
| 2016/0283824 A1 | 9/2016 | Fukushima |
| 2017/0025088 A1 | 1/2017 | Alon et al. |
| 2017/0161695 A1 | 6/2017 | Carpenter et al. |
| 2017/0337352 A1 | 11/2017 | Williams |
| 2018/0121988 A1 | 5/2018 | Hiranandani et al. |
| 2018/0174195 A1 | 6/2018 | Agarwal |
| 2018/0204061 A1 | 7/2018 | Antol et al. |
| 2018/0373955 A1* | 12/2018 | Soldevila .............. G06K 9/6201 |
| 2019/0200090 A1* | 6/2019 | Merced .............. H04N 21/4826 |
| 2019/0371064 A1* | 12/2019 | Anderson .............. G06T 19/006 |

OTHER PUBLICATIONS

Lochtenfeld: "Augmented reality-based advertising strategies for paper leaflets", Source: UbiComp 2013 Adjunct—Adjunct Publication of the 2013 ACM Conference on Ubiquitous Computing, p. 1015-1021, 2013, UbiComp 2013 Adjunct—Adjunct Publication of the 2013 ACM Conference on Ubiquitous Computing; ISBN-13: 9781450322157; DOI: 10.1145/2494091.2496005; Conference: 2013 ACM Conference on Ubiquitous Computing, UbiComp 2013, Sep. 8, 2013-Sep. 12, 2013.

Lopes-Nores et al: "Augmented reality, smart codes and cloud computing for personalized interactive advertising on billboards", Source: Proceedings—10th International Workshop on Semantic and Social Media Adaptation and Personalization, SMAP 2015, p. 34-39, Dec. 31, 2015, Proceedings—10th International Workshop on Semantic and Social Media Adaptation and Personalization, SMAP 2015.

Rukzio et al.: "Physical posters as gateways to context-aware services for mobile devices", Rukzio et al.: "Physical posters as gateways to context-aware services for mobile devices", Source: Sixth IEEE Workshop on Mobile computing Systems and Applications, Conference Dates: Dec. 3, 2004, Print ISBN: 0-7695-2258-0, DOI: 10.1109/MCSA.2004.20.

Grubert et al.: "Exploring the design of hybrid interfaces for augmented posters in public spaces", Source: NordiCHI '12 Proceedings of the 7th Nordic Conference on Human-Computer Interaction: Making Sense Through Design, pp. 238-246 , Oct. 14-17, 2012, Conference Dates: Oct. 14-17, 2012, ISBN: 978-1-4503-1482-4.

Maurya: "20 Best Free Augmented Reality Apps" , Source: PCQuest Feb. 14, 2017.

Unknown: "Youtube Video—Augmented Reality eLearning Banking", Published on Apr 3, 2018, https://www.youtube.com/watch?v=YOc3KnBFxp4, Located via Youtube.

* cited by examiner

SYSTEM AND METHOD FOR PRESENTING PLACARDS IN AUGMENTED REALITY

CROSS-REFERENCE TO RELATED APPLICATION

This application is a continuation of U.S. patent application Ser. No. 16/145,365 entitled "System and Method for Presenting Placards in Augmented Reality", filed on Sep. 28, 2018, the contents of which are herein incorporated by reference in their entirety.

TECHNICAL FIELD

The present application relates to computer graphics processing and, more particularly, to presenting placards in augmented reality.

BACKGROUND

In the real-world, placards such as, for example, posters, signs or the like, may be presented to provide information for a variety of purposes such as, for example, to provide information, for advertising. As physical objects, such placards cannot be customized for particular viewers based on considerations such, as for example, cultural, linguistic, or other reasons.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
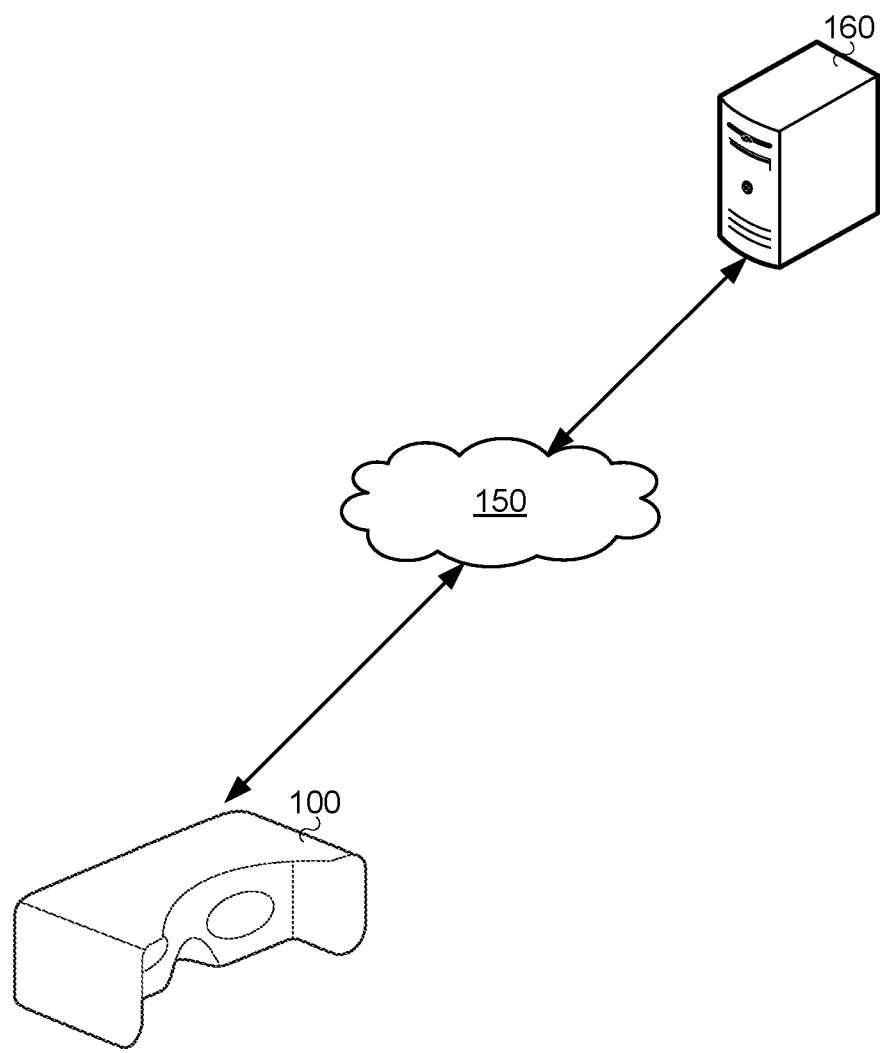
FIG. 1 is a schematic operation diagram illustrating an operating environment of an example embodiment.

According to the subject matter of the present application, there may be provided a system including a mobile computing device and a server computing device.

The mobile computing device may include a first processor, an image capture module coupled to the first processor, a display module coupled to the first processor, a first communications module coupled to the first processor, and a first memory module coupled to the first processor.

The server computing device may include a second processor, a second communications module coupled to the second processor, and a second memory module coupled to the second processor.

It may be that the first memory module stores instructions that, when executed by the first processor, cause the mobile computing device to capture, using the image capture module, an image of a portion of an environment, the image of the portion of the environment including an image of at least a portion of a first placard; extract the image of the at least a portion of the first placard from the image of the portion of the environment; and send, to the server computing device via a network using the first communications module, an indication of the image of the at least a portion of the first placard.

It may be that the second memory module stores instructions that, when executed by the second processor cause the server computing device to receive, from the mobile computing device via the network using the second communications module, the indication of the image of the at least a portion of the first placard; identify, based on the indication, in a data store storing information related to a plurality of placards, a placard matching the indication; retrieve, from the data store, images of further placards related to the matching placard; select, based on configuration data, one of the images of further placards; and send, to the mobile computing device via the network using the second communications module, the selected one of the images of further placards for display in augmented reality.

It may be that the first memory module stores further instructions that, when executed by the first processor, cause the mobile computing device to: receive, from the server computing device via the network using the first communications module, the selected one of the images of further placards for display in augmented reality; and display an augmented reality version of the environment using the display module, wherein the displaying includes rendering portions of the environment including the first placard by compositing images captured using the image capture module with the selected one of the images of further placards so as to substantially replace the first placard with the selected further placard.

Conveniently, in this way, a placard may be replaced in augmented reality with another related and potentially more relevant placard.

According to the subject matter of the present application, there may be provided a mobile computing device including a processor, an image capture module coupled to the processor, a display module coupled to the processor, a communications module coupled to the processor, and a memory module coupled to the processor. The memory module may store instructions that, when executed by the processor, cause the mobile computing device to: capture, using the image capture module, an image of a portion of an environment, the image of the portion of the environment including an image of at least a portion of a first placard; extract the image of the at least a portion of the first placard from the image of the portion of the environment; send, to a remote computing device via a network using the communications module, an indication of the image of the at least a portion of the first placard, wherein the remote computing device is adapted to provide an image of a further placard related to the first placard based on configuration data; receive, from the remote computing device via the network using the communications module, the image of the further placard related to the first placard; and display an augmented reality version of the environment using the display module, wherein the displaying includes rendering portions of the environment including the first placard by compositing images captured using the image capture module with the image of the further placards so as to substantially replace the first placard with the further placard.

According to the subject matter of the present application, there may be provided a computer-implemented method comprising: capturing, using an image capture module, an image of a portion of an environment, the image of the portion of the environment including an image of at least a portion of a first placard; extracting the image of the at least a portion of the first placard from the image of the portion of the environment; sending, to a remote computing device via a network, an indication of the image of the at least a portion of the first placard, wherein the remote computing device is adapted to provide an image of a further placard related to the first placard based on configuration data; receiving, from the remote computing device via the network, the image of the further placard related to the first placard; and displaying an augmented reality version of the environment, wherein the displaying includes rendering portions of the environment including the first placard by compositing images captured using the image capture module with the image of the further placard so as to substantially replace the first placard with the further placard.

According to the subject matter of the present application, there may be provided a non-transitory computer-readable storage medium storing instructions that, when executed by a processor of a computing device, cause the computing device to: capture, using an image capture module, an image of a portion of an environment, the image of the portion of the environment including an image of at least a portion of a first placard; extract the image of the at least a portion of the first placard from the image of the portion of the environment; send, to a remote computing device, an indication of the image of the at least a portion of the first placard, wherein the remote computing device is adapted to provide an image of a further placard related to the first placard based on configuration data; receive, from the remote computing device, the image of the further placard related to the first placard; and display an augmented reality version of the environment, wherein the displaying includes rendering portions of the environment including the first placard by compositing images captured using the image capture module with the image of the further placard so as to substantially replace the first placard with the further placard.

According to the subject matter of the present application, there may be provided a computing device comprising: a processor; a communications module coupled to the processor; and a memory module coupled to the processor and storing instructions that, when executed by the processor, cause the computing device to: receive, from a mobile computing device via a network using the communications module, an indication of an image of at least a portion of a first placard captured in an environment; identify, based on the indication, in a data store storing information related to a plurality of placards, a placard matching the indication; retrieve, from the data store, images of further placards related to the matching placard; select, based on configuration data, one of the images of further placards; and send, to the mobile computing device via the network using the communications module, the selected one of the images of further placards for display in augmented reality.

According to the subject matter of the present application, there may be provided a computer-implemented method comprising: receiving, from a mobile computing device via a network, an indication of an image of at least a portion of a first placard captured in an environment; identifying, based on the indication, in a data store storing information related to a plurality of placards, a placard matching the indication; retrieving, from the data store, images of further placards related to the matching placard; selecting, based on configuration data, one of the images of further placards; and sending, to the mobile computing device via the network, the selected one of the images of further placards for display in augmented reality.

According to the subject matter of the present application, there may be provided a non-transitory computer-readable storage medium storing instructions that, when executed by a processor of a computing device cause the computing device to: receive, from a mobile computing device via a network, an indication of an image of at least a portion of a first placard captured in an environment; identify, based on the indication, in a data store storing information related to a plurality of placards, a placard matching the indication; retrieve, from the data store, images of further placards related to the matching placard; select, based on configuration data, one of the images of further placards; and send, to the mobile computing device via the network, the selected one of the images of further placards for display in augmented reality.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a wearable augmented reality device 100 and a server system 160 communicate via a network 150.

The wearable augmented reality device 100 and the server system 160 may be in geographically disparate locations. Put differently, the wearable augmented reality device 100 may be remote from the server system 160.

The wearable augmented reality device 100 and the server system 160 are computer systems.

The wearable augmented reality device 100 is adapted to present augmented reality environments, a specialized form of virtual reality in which graphic objects in a virtual-reality environment are related to objects in a real-world scene or environment and are presented in real-time as that real-world environment is captured using an image capture module.

As further described below, the server system 160 is adapted to provide information to the wearable augmented reality device 100 including placards for presentation in the augmented reality environments.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, or the like.

As further explained below, the wearable augmented reality device 100 communicates with the server system 160 via the network 150 in order to present an augmented reality version of an environment in which a placard is replaced by a related placard.

Figure 2:
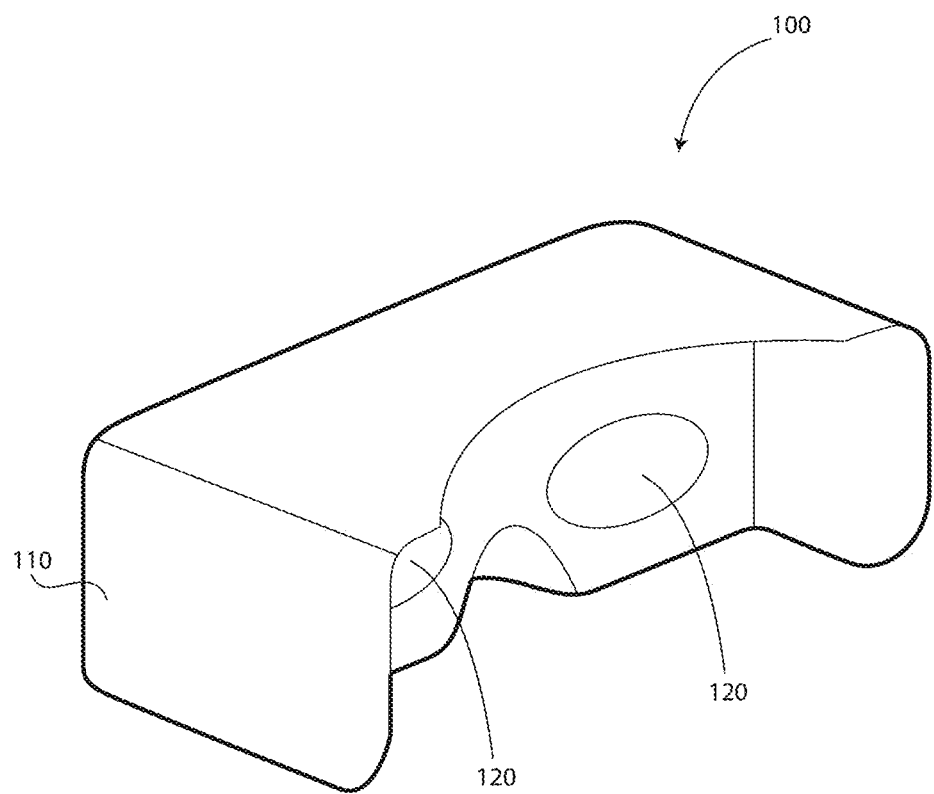
FIG. 2 shows a wearable augmented reality device, exemplary of an embodiment.

The wearable augmented reality device 100 will now be described in greater detail with reference to FIG. 2.

As illustrated, the wearable augmented reality device 100 includes a body 110. The body 110 is shaped so as to allow a viewer to hold it up against their face above their nose such as in manners similar to holding a pair of goggles against one's face.

The wearable augmented reality device 100 includes a pair of viewports 120. A viewer may look through the viewports 120 with their eyes to view one or more internal displays (not shown) of the wearable augmented reality device 100. The viewports 120 may include lenses that may, for example, assist the viewer in focussing on the display. The spacing of the viewports 120 provides a separate view for each of the eyes of the viewer so as to provide for a stereoscopic separation, thereby allowing the viewer to experience a three-dimensional augmented reality environment.

Figure 3:
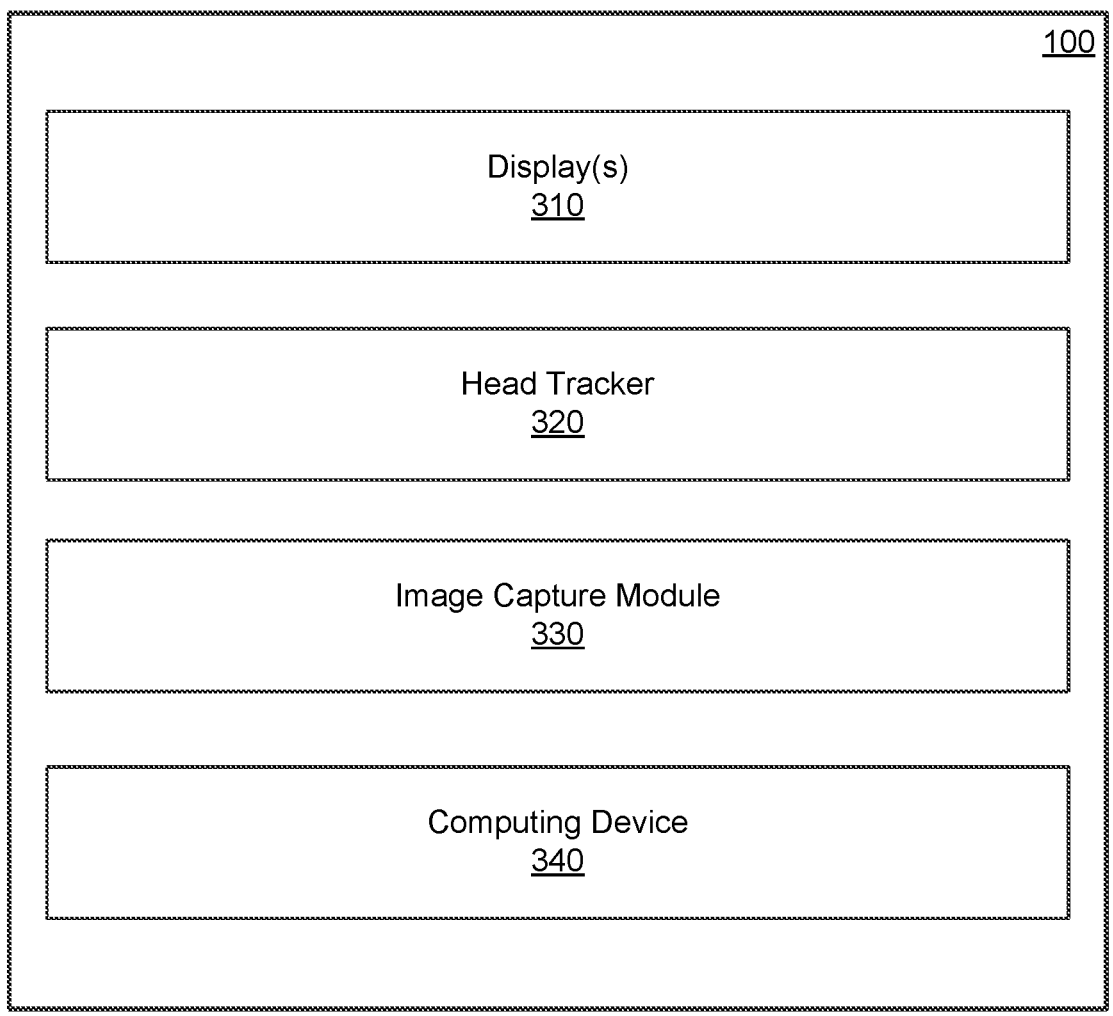
FIG. 3 is a simplified schematic diagram showing components of the wearable augmented reality device of FIG. 2.

FIG. 3 is a simplified schematic diagram showing components of the wearable augmented reality device 100.

The wearable augmented reality device 100 may, as illustrated, include one or more displays 310, a head tracker 320, an image capture module 330, and a computing device 340.

The one or more displays 310 are a display module. The one or more displays 310 are used to display images of a stereoscopic projection of a three-dimensional virtual environment to a viewer. The one or more displays 310 may be internal displays of the wearable augmented reality device 100 (FIGS. 1, 2) (e.g., disposed within the body 110) and may be in communication with the viewports 120.

The head tracker 320 tracks the head of a viewer when the wearable augmented reality device 100 is worn. For example, the head tracker 320 may track movements of the head of a viewer using, for example, one or more accelerometers, tilt/pan sensors, and/or the like.

The image capture module 330 is used to capture images of portions of an environment that will be presented in augmented reality by way of the one or more displays 310. The image capture module 330 may be a camera. The image capture module 330 may be or may include a digital image sensor system as, for example, a charge coupled device (CCD) or a complementary metal-oxide-semiconductor (CMOS) image sensor.

The computing device 340 is in communication with the one or more displays 310 and the head tracker 320. The computing device 340 may render the three-dimensional virtual environment presented to a viewer via the one or more displays 310. More particularly, the computing device 340 may render portions of the three-dimensional virtual environment presented to a viewer for presentation via the one or more displays 310 based on movements of a viewer's head detected via the head tracker 320 as they look around the three-dimensional virtual environment.

In some embodiments, each of the components of the wearable augmented reality device 100 may be mounted on or integrated into the wearable augmented reality device 100. Alternatively, it may be that components such as, for example, the one or more displays 310 and the head tracker 320 are integrated into the wearable augmented reality device 100, while others of the components such as, for example, the computing device 340 may be separately housed with the different components communicating via some communications link such as, for example, via wired or wireless connection(s) therebetween.

Figure 4:
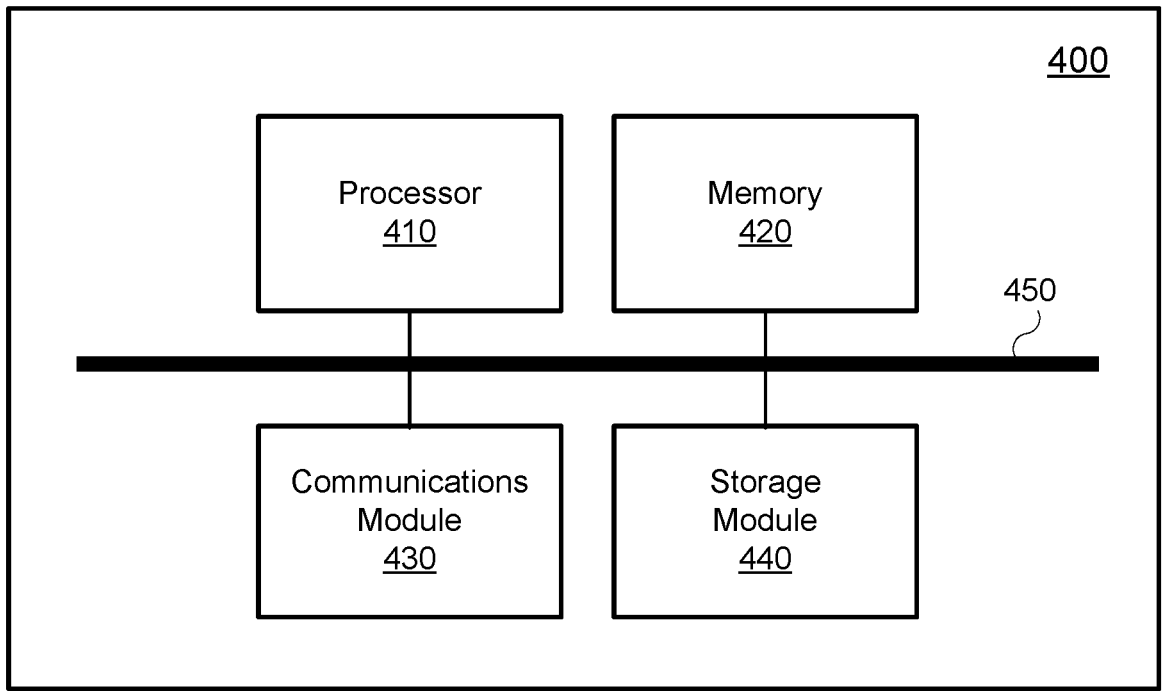
FIG. 4 is high-level schematic diagram of an example computing device.

FIG. 4 is a high-level operation diagram of an example computing device 400. In some embodiments, the example computing device 400 may be exemplary of the computing device 340 (FIG. 3) and/or the server system 160.

The example computing device 400 includes a variety of modules. For example, as illustrated, the example computing device 400 may include a processor 410, a memory 420, a communications module 430, and/or a storage module 440. As illustrated, the foregoing example modules of the example computing device 400 are in communication over a bus 450.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 400.

The communications module 430 allows the example computing device 400 to communicate with other computing devices and/or various communications networks. For example, the communications module 430 may allow the example computing device 400 to send or receive communications signals. Communications signals may be sent or received according to one or more protocols or according to one or more standards. For example, the communications module 430 may allow the example computing device 400 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 430 may allow the example computing device 400 to communicate using near-field communication (NFC), via Wi-Fi™, using Bluetooth™ or via some combination of one or more networks or protocols. In some embodiments, all or a portion of the communications module 430 may be integrated into a component of the example computing device 400. For example, the communications module may be integrated into a communications chipset.

The storage module 440 allows the example computing device 400 to be stored and retrieved. In some embodiments, the storage module 440 may be formed as a part of the memory 420 and/or may be used to access all or a portion of the memory 420. Additionally or alternatively, the storage module 440 may be used to store and retrieve data from persisted storage other than the persisted storage (if any) accessible via the memory 420. In some embodiments, the storage module 440 may be used to store and retrieve data in a database. A database may be stored in persisted storage. Additionally or alternatively, the storage module 440 may access data stored remotely such as, for example, as may be accessed using a local area network (LAN), wide area network (WAN), personal area network (PAN), and/or a storage area network (SAN). In some embodiments, the storage module 440 may access data stored remotely using the communications module 430. In some embodiments, the storage module 440 may be omitted and its function may be performed by the memory 420 and/or by the processor 410 in concert with the communications module 430 such as, for example, if data is stored remotely.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

Figure 5:
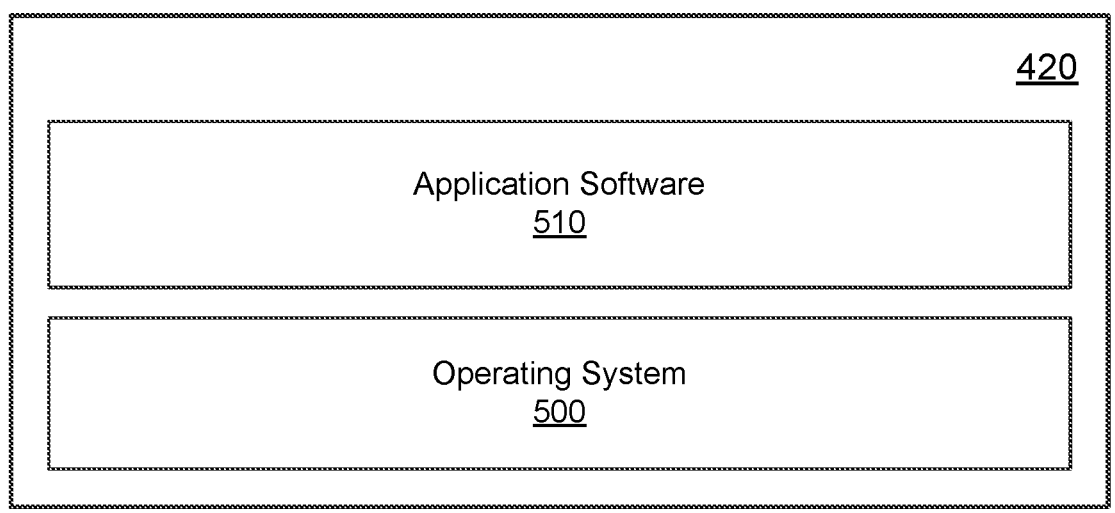
FIG. 5 shows a simplified organization of software components stored in a memory of the example computing device of FIG. 4.

FIG. 5 depicts a simplified organization of software components stored in the memory 420 of the example computing device 400 (FIG. 4). As illustrated, these software components include an operating system 500 and an application software 510.

The operating system 500 is software. The operating system 500 allows the application software 510 to access the processor 410 (FIG. 4), the memory 420, and the communications module 430 of the example computing device 400 (FIG. 4). The operating system 500 may be, for example, Google™ Android™, Apple™ iOS™, UNIX™, Linux™, Microsoft™ Windows™, Apple OSX™ or the like.

The application software 510 adapts the example computing device 400, in combination with the operating system 500, to operate as a device performing a particular function. For example, the application software 510 may cooperate with the operating system 500 to adapt a suitable embodiment of the example computing device 400 to operate as the computing device 340 (FIG. 3) of the wearable augmented reality device 100 (FIG. 3) or as the server system 160 (FIG. 1).

Operations performed by the wearable augmented reality device 100 and the server system 160 will be described below with reference to FIGS. 6-10.

Figure 6:
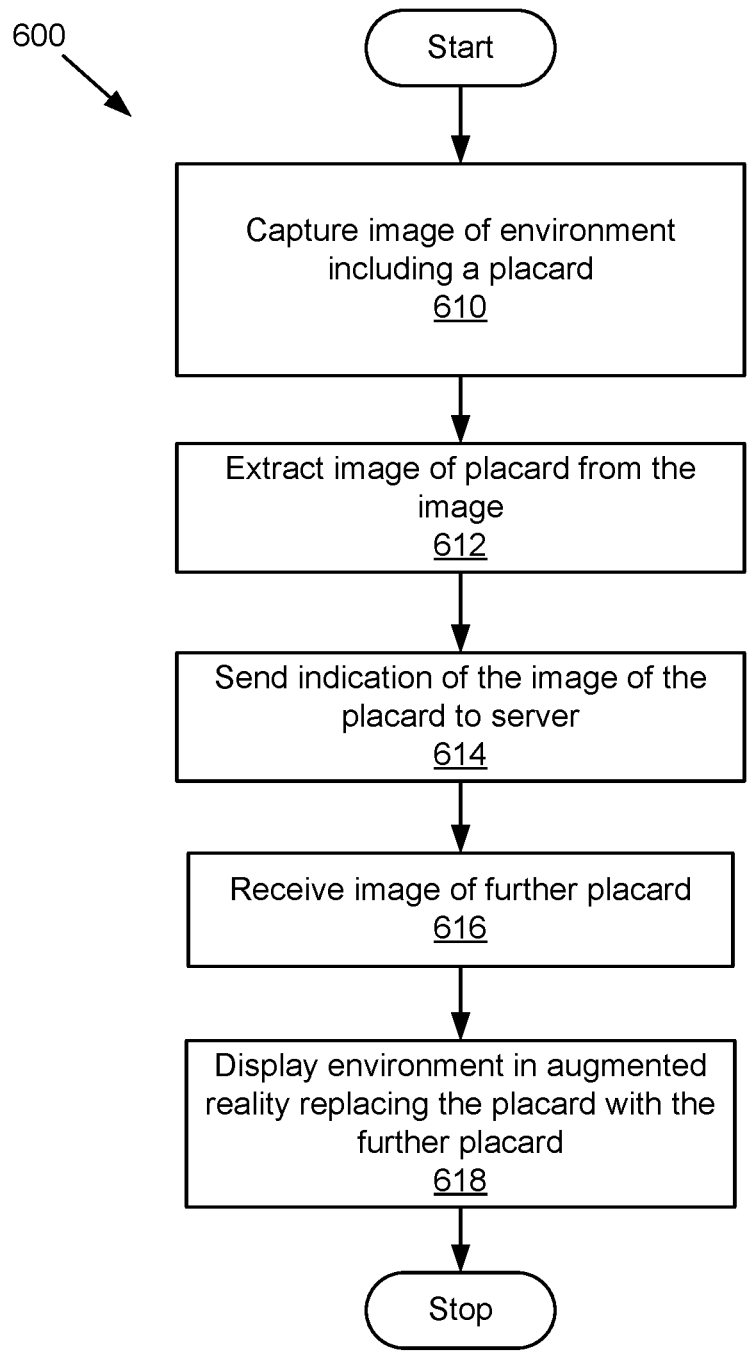
FIG. 6 is a flowchart showing operations performed by a mobile computing device in presenting an environment in augmented reality with a placard replaced by another placard.

The operation of the wearable augmented reality device 100 in presenting placards in three-dimensional augmented reality via the one or more displays 310 (FIG. 3) will now be described with reference to a flowchart 600 of FIG. 6. Operations 610 and onward are performed by one or more processors of the computing device 340 (FIG. 3), such as, for example, the processor 410 (FIG. 4) of a suitably configured instance of the example computing device 400 (FIG. 4), executing software such as, for example, a suitable instance of the application software 510 (FIG. 5).

At the operation 610, an image of a portion of an environment is captured. The image may be captured using the image capture module 330. The image of the portion of the environment includes at least a portion of a placard.

Figure 7:
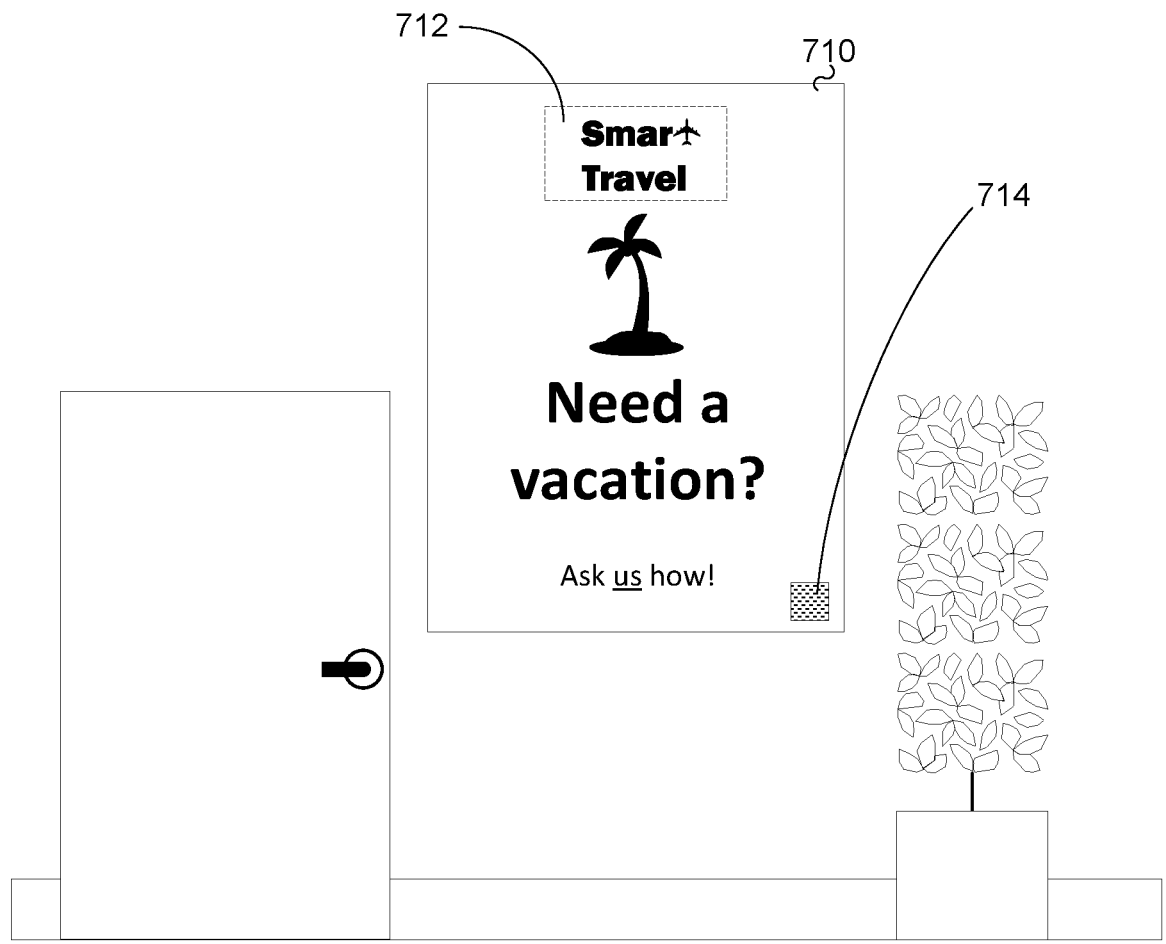
FIG. 7 is a simplified illustration of an environment including a placard.

FIG. 7 is a simplified illustrated of an environment 700. The environment 700 is an example of an environment of which a portion could be captured using the image capture module 330 at the operation 610.

The environment 700 includes an example placard 710. As illustrated, the example placard 710 is a poster advertising travel services. However, other types of placards are also contemplated including, for example, signs, other types of posters, billboards and the like.

Referring again to FIG. 6, after the operation 610, an operation 612 is next.

At the operation 612, the image of the placard is analyzed and a portion of the image including the placard is extracted therefrom. In other words, an image of the at least a portion of the placard is extracted from the image of the portion of the environment that was captured at the operation 610.

The portion of the image of the environment corresponding to at least a portion of the placard may be extracted in a variety of manners. Examples of extracting an image of the at least a portion of the placard will now be discussed with reference to FIG. 7.

As shown in FIG. 7, the example placard 710 includes a logo 712. It may be that the logo 712 is a known image that will be placed on some or all of the placards that are to be replaced according to the subject matter of the present application. For example, it may be that such a logo image is included in a defined position or one or several possible defined positions on the various placards that are to be replaced. Accordingly, it may be that analysis of an image of a portion of an environment recognizes the presence of at least a portion of the placard by detecting a logo like the logo 712 in the image of the portion of the environment. Having so recognized the presence of a placard, the image of the at least a portion of the placard may be extracted in a variety of manners. For example, placards may be of a defined size such that the extent of a placard in an image may be determined based on the relative size of a logo such as the logo 712 in the image of the portion of the environment. More particularly, it may be that the extents of the placard or the portion thereof in the captured image can be computed on a pixel basis based on the size in pixels of a logo in a placard. Additionally or alternatively, it may be that once such a logo is recognized in a placard, the extents thereof can be determined based on the logo being in a defined position on placards where it appears and also of a defined size relative to the size of the placard. Additionally or alternatively, the background of a placard (e.g., its colour) may be selected to contrast with the environment so as to allow extraction of an image of the placard (or the portion thereof that was captured) from an image of a portion of the environment once the presence of a placard in the captured image is detected based on the presence of a logo.

As further shown in FIG. 7, the example placard 710 includes a machine-interpretable indicium 714. The machine-interpretable indicium 714 may, for example, be a barcode, a 2D barcode such as a QR code, a data-matrix code or similar, or some other indicium capable of being interpreted by a computing device based on a captured image. Such an indicium may, akin to a logo, be placed in a defined position on a poster and/or may be of a defined size. Conveniently, this may allow an image of the at least a portion of a placard to be extracted in manners similar to with a logo having a defined size and/or position as discussed above. For example, based on a position of a machine-readable indicium in the image of a portion of an environment, edges of at least a portion of a placard including the machine-readable indicium may be identified. Then, based on the identified edges, an image of the at least a portion of the placard may be extracted from the image of the portion of the environment based on the identified edges.

Conveniently, inclusion of a machine-interpretable indicium such as, for example, the machine-interpretable indicium 714, in a placard may allow a particular placard to be identified without performing image processing on the rest of the placard. This may, in turn, allow information about a captured placard to be obtained such as may assist in processing including, potentially, the extraction of an image of the at least a portion of the placard from an image of a portion of an environment including the placard. For example, information about the background colour of the placard, the size of the placard, the position of a machine-interpretable indicium on the particular placard, the edges of the particular placard etc. could be obtained from or based on a machine-interpretable indicium. It could, for example, be that an identifier extracted a machine-interpretable indicium (e.g., by interpreting it) could be sent to a server as a part of a request in order to obtain a reply including such information. For example, the wearable augmented reality device 100 may communicate with the server system 160 in order to obtain such information.

In another example, a machine-interpretable indicium such as, for example, the machine-interpretable indicium 714, may directly encode information including, potentially, information as may assist in extraction of an image of the at least a portion of a placard from an image of a portion of an environment such as, for example, information about the background colour of the placard, the size of the placard, the position of a machine-interpretable indicium on the particular placard, the edges of the particular placard etc. Conveniently, by encoding such information directly in a placard in machine readable form, communications with a remote computer system such as, for example, the server system 160 may be reduced and/or avoided.

The above examples of extracting an image of a portion of a placard from an image of a portion of an environment including the placard are, however, by way of example only. Other techniques, whether existing or developed in the future, may equally be applied at the operation 612 as a part of an implementation of the subject matter of the present application. In a particular example, it may be that one or more techniques discussed above may be applied in combination. For example, where a placard includes both a known logo and a machine-interpretable indicium (e.g., akin to the example placard 710), the size and/or position of each may be considered in extracting an image of at least a portion of such a placard from an image captured of a portion of an environment including at least a portion of the placard. Conveniently, in this way, accuracy of the extraction may be improved as compared to if only one or the other is considered. Additionally or alternatively, extraction that can flexibly operate based on the presence of both a logo and a machine-interpretable indicium may be more robust than if only one or the other is considered. For example, it may be that where both are considered, then the presence of a portion of the placard in a captured image of a portion of an environment may be detected even if only one or the other is included in the captured portion of the placard. In some embodiments, placards may include more than one logo and/or more than one machine-interpretable indicium to similar ends and, potentially, to further advantage.

Returning to FIG. 6, following the operation 612, an operation 614 is next.

At the operation 614, an indication of the image of the at least a portion of the placard extracted at the operation 612 is sent to a remote computing device via a network. For example, such an indication may be sent to the server system 160 via a network such as, for example, the Internet. The indication may be sent using a communications module of the computing device 340 (FIG. 3) such as, for example, the communications module 430 (FIG. 4) where the computing device 340 is a suitably configured instance of the example computing device 400 (FIG. 4).

Processing by the remote computing device responsive to such a request is further described below with reference to processing as may be performed by the server system 160. By way of overview, an image of a related placard that, as further described below, will replace the placard in the environment when the environment is viewed in augmented reality using the wearable augmented reality device 100 may be selected by such a remote computing device.

Following the operation 614, an operation 616 is next.

At the operation 616, an image of a further placard is received. The further placard may, as mentioned above, be a related placard to the placard in the environment of which at least a portion was captured at the operation 610. The further placard may be selected in a variety of fashions as further described below.

Figure 8:
FIG. 8 shows a related placard to the placard of FIG. 7.

FIG. 8 provides an example further placard 800 that is related to the example placard 710 (FIG. 7).

As illustrated, the example further placard 800 includes similar messages to the example placard 710, but in French instead of English. Notably, however, the example further placard 800 may not simply be a word-by-word translation of the example placard 710. Instead, it may also include different graphics (such as, for example, as may be more culturally appropriate for a Francophone audience than those in the example placard 710) or may include slightly different text. For example, the text could reference products or promotions being targeted to and/or only being offered to Francophone audiences.

Following the operation 616, an operation 618 is next.

At the operation 618, the environment is presented in augmented reality via a display module, with the placard being replaced in the augmented reality version of the environment displayed using the display module by the further placard using the image of it that was received at the operation 616. More particularly, an augmented reality version of the environment is presented to a viewer using the wearable augmented reality device 100 with the augmented reality version being displayed to the user using the one or more displays 310. In order to present such an augmented reality version of the environment, further images of the portions of the environment may be captured using the image capture module 330. Images captured using the image capture module 330 may be composited with the image of the further placard so as to substantially replace the placard in the augmented reality version of the environment with the further placard such as when the placard or portions thereof are visible in the portion of the environment being rendered in augmented reality.

Figure 9:
FIG. 9 is a simplified illustration of an augmented reality presentation of the environment of FIG. 7 with the placard of FIG. 7 replaced by the related placard of FIG. 8.

An example, of replacing a placard with another placard in augmented reality is shown in FIG. 9. As illustrated, in an augmented reality version of the environment 700 (FIG. 7), the example placard 710 has been replaced by the placard 800 (FIG. 8). In this way, the augmented reality version of the environment 700 provides a French-language placard in lieu of the English-language one that is physically present in the environment 700.

The operation of the server system 160 in selecting a related placard will now be described with reference to a flowchart 1000 of FIG. 10. Operations 1010 and onward are performed by one or more processors of the server system 160 executing software. For example, the operations 1010 may be performed further to the processor 410 (FIG. 4) executing software such as, for example, a suitable instance of the application software 510 (FIG. 5) where the server system 160 is a suitably configured instance of the example computing device 400 (FIG. 4).

At the operation 1010, an indication of an image of a placard is received by the server system 160 from a mobile device via a network. The indication is received via the network using a communications module. For example, where the server system 160 is a suitably configured instance of the example computing device 400, such an indication may be received using the communications module 430 via a network such as, for example, the Internet. In a particular example, the server system 160 may receive such an indication from the wearable augmented reality device 100. For example, the received indication may correspond to an indication as may be sent at the operation 614 (FIG. 6).

Following the operation 1010, an operation 1012 is next.

At the operation 1012, a placard matching the indication received at the operation 1010 is identified in a data store storing information related to various placards. For example, where the server system 160 is a suitably configured instance of the example computing device 400, such a store may be accessed and a matching placard identified based on the indication by way of one or both of the storage module 440 and the communications module 430.

Following the operation 1012, an operation 1014 is next.

At the operation 1014, images of one or more further placards are identified. The one or more further placards are related to the matching placard identified at the operation 1012. For example, the further placards may be other members of a family of related placards such as, for example, localizations and/or translations of the matching placard. Additionally or alternatively, one or more of the further placards may be or may act as a template for providing a customized version of the matching placard and/or a customized version of a related placard to the matching placard as further described below. The images of one or more further placards may be identified in the data store consulted at the operation 1012. It may be that the images are retrieved. For example, the images may be received from the aforementioned data store.

Following the operation 1014, an operation 1016 is next.

At the operation 1016, one of the images of further placards is selected. The selection may be made based on configuration data. Examples of bases for and manners of selection will now be discussed.

In a first example of selecting an image of a further placard based on configuration data, it may be that the configuration data includes data of a profile associated with a user. For example, such data may be about the user of the wearable augmented reality device 100. In a particular example, an indication or identifier corresponding to the user of the mobile device to the server system 160 and may be used to retrieve the configuration data and/or, more specifically, a profile associated with that user.

Such a profile may include data such as, for example, a preferred language or a location. For example, where the placard associated with the indication received at the operation 1010 is in a first language other than the preferred language, the selected further placard may be in the preferred language. For example, considering the example of FIGS. 7-9, it may be that the user's preferred language is French and so the placard 800 (FIG. 8) is selected to replace the example placard 710 (FIG. 7) which is in English. As shown in those drawings, for example, the further placard may be a translation of the first placard including the same graphical elements as the placard in the environment, but with translated textual elements in the preferred language.

In a second example of selecting an image of a further placard based on configuration data, it may be that the further placard is selected based on factors such as, for example, a current date and/or a current time. For example, a further placard may be selected to correspond to a holiday (e.g., Christmas themed in the holiday season, themed based on current events such as, for example, sporting events like the Olympics or the World Cup, etc.) or a day of the week (e.g., "TGIF" if the further placard is being selected on a Friday). In some embodiments, the selection may also be selected based on configuration data. For example, if the selection is based on a preferred language and the preferred language is Spanish then, depending on the date, a Cinco-de-Mayo-themed placard could be selected. Additionally or alternatively, other demographic data may be considered such as, for example, age or residential location.

In a third example of selecting an image of a further placard based on configuration data, it may be that the further placard is selected for reasons of accessibility. For example, a large print version of a physical placard may be provided for rendering in augmented reality such as to accommodate a user with a vision impairment.

The above are merely examples of how an image of a further placard may be selected based on configuration data and other bases of selection may, additionally or alternatively, be employed in some implementations of the subject matter of the present application.

Following the operation 1016, an operation 1018 is next.

At the operation 1018, the selected one of the images of further placards is sent, via the network, to the mobile computing device from which the indication was received at the operation 1010. The image of the further placard is sent to the mobile computing device for display in augmented reality. For example, it may be that the selected image of a further placard is sent to the wearable augmented reality device 100 via a network such as, for example, the Internet, for display in augmented reality.

Figure 10:
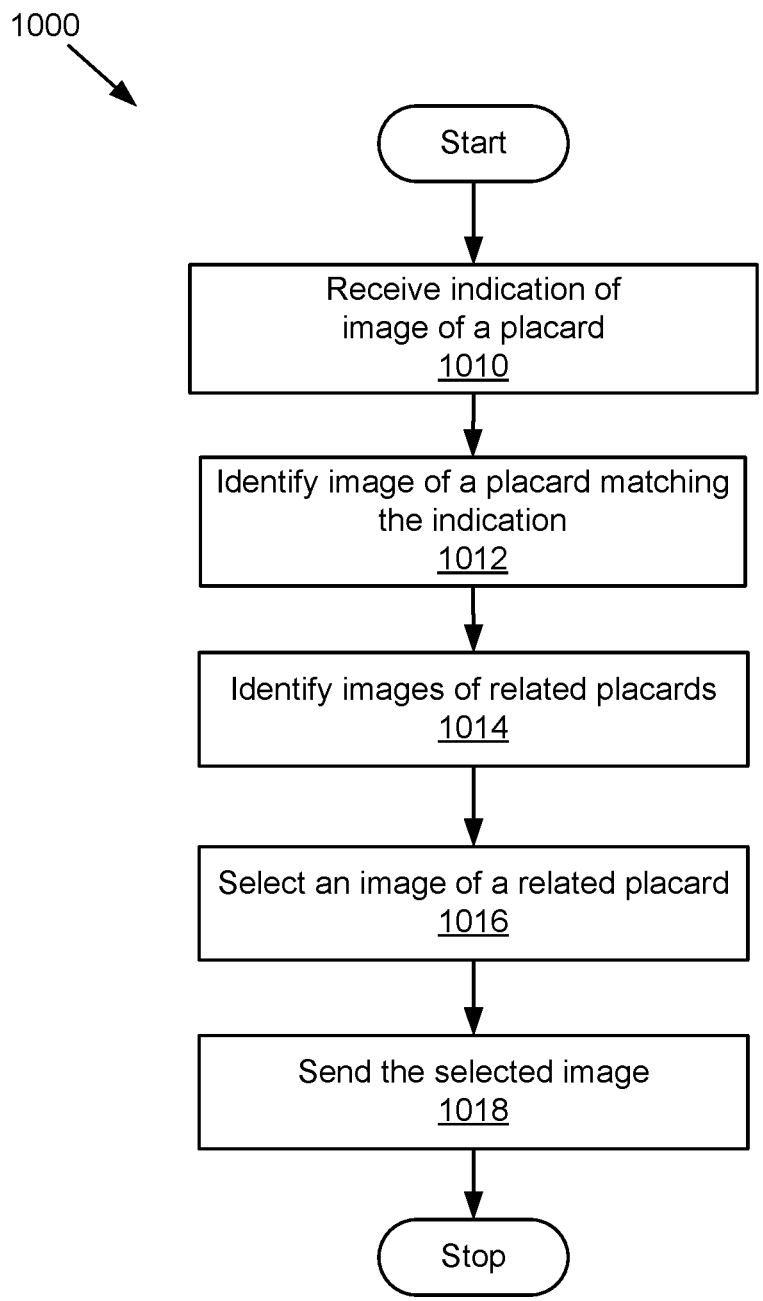
FIG. 10 is a flowchart showing operations performed by a server computing device in identifying related placards to a placard in an environment and selecting one of the related placards for display in augmented reality.

The method illustrated in the FIG. 10 is capable of variation.

For example, in some embodiments, the further placard may be modified by the remote computing device prior to sending it to the mobile computing device using the network. Such modification may be based on the configuration data. The modification may include, for example, selectively adding or deleting information from placard. For example, text may be inserted into the image. In a particular example, the further placard could be modified to include an offer customized for a particular user. In another example, the further placard could, additionally or alternatively, be modified based on a location of the mobile computing device and/or a name of the user associated with the mobile computing device. For example, where the mobile computing device is at a particular location, the further placard could be modified based on that location. For example, the further placard could be modified to include information relevant to that location such as, for example, information about a contact person related to that location such, as for example contact information, a photo and/or a name for the contact person. In another example, the further placard could be modified to include a name or a photo relevant to the particular user such as, for example, as mentioned above, their name and/or, potentially, their photo or a photo of a related person. Additionally or alternatively, information related to a previous purchase the person made may serve as a basis for modification. For example, information about a related product or service could be provided. Conveniently, in this way, engagement with the further placard could be increased as compared to if the further placard is not so customized. After modification, the image of the further placard as modified may be sent to the mobile computing device for display in augmented reality.

In another example of possible variations, beyond sending/receiving an indication of the extracted image of the at least a portion of the placard, an indication of an identifier for the placard could, additionally or alternatively, be provided. For example, such an identifier could be extracted from or determined based on interpretation of a machine-interpretable indicium included in the placard. Notably, it may be that providing such an identifier may improve accuracy in the identification of a placard matching the indication (e.g., at the operation 1012 (FIG. 10).

In yet another example of possible variations, it may be that functionality is provided whereby the further placard can be saved for later. For example, it may be that a history is maintained of the further placards that were viewed in augmented reality. In a particular example, such a history may be maintained on the mobile computing device such as, for example, in a memory thereof. It may then may be that a selection may be provided to the mobile computing device indicating that a selected further placard (e.g., selected from the history) should be displayed a second environment—i.e., in an environment other than that for which the augmented reality version was provided. The selected further placard may then be displayed in augmented or virtual reality. Conveniently, in this way, a user may be permitted to review information from a placard at a later time. For example, a user could present that information to another person such as, for example, a spouse. The selected further placard could be displayed in augmented reality in the second environment but could be presented in a fixed position, such as, for example, directly in front of a viewer. In other words, displaying the augmented reality version of the second environment could include rendering portions of the second environment including the further placard by compositing captured images of the second environment (e.g., captured using an image capture module such as the image capture module 330) with an image of the further placard. In this way, the selected further placard can be presented in a fixed location in an augmented reality of the second environment.

In a yet even further example of possible variations, it may also be that rather than extracting what is known to be at least a portion of a placard at the operation 612 (FIG. 6), what is extracted may instead be a presumptive match for the same. For example, it could be that placards are of a defined aspect ratio and/or include certain defined elements (or selected ones thereof) and that any image including elements matching such a "stencil" is considered to include a presumptive match. Such presumptive matches may be sent to the remote server (e.g., at the operation 614) and a further placard may only be returned (e.g., and received at the operation 616) if the remote server is able to match to presumptive placard to a known placard. For example, at the operation 1012 (FIG. 10), if no match is identified, then no response to the indication received at the operation 1010 may be sent or, alternatively, an indication of a lack of a match for the indication of an image of at least a portion of a presumptive placard may be sent to the mobile computing device instead of a further placard.

In a yet further example of possible variations, extraction of placards from images of the environment may be performed at the remote server in addition or as alternative to doing so at the mobile device. For example, the mobile device may send entire images of captured portions of the environment to the remote server. In a particular example, such images may be sent at particular intervals or when the mobile device is detected to have moved a threshold amount since a last image was sent to the remote server. A further placard may only be returned (e.g., and received at the operation 616) if the remote server is able to match to find a match for a known placard in the received image. Where a match for a known placard is found, the remote server may, in addition to sending a replacement placard, also send information or metadata to allow the mobile device to replace that placard with the replacement placard for rendering the augmented reality version of the environment. For example, such information or metadata may include an image of the matching placard, information about its size and/or colour (and/or the colour of portions thereof) and/or its edges, etc.

In a yet further example of possible variations, other sorts of augmented reality devices may be employed. An example alternative augmented reality device will now be described with reference to FIGS. 11A and 11B.

Figure 11A:
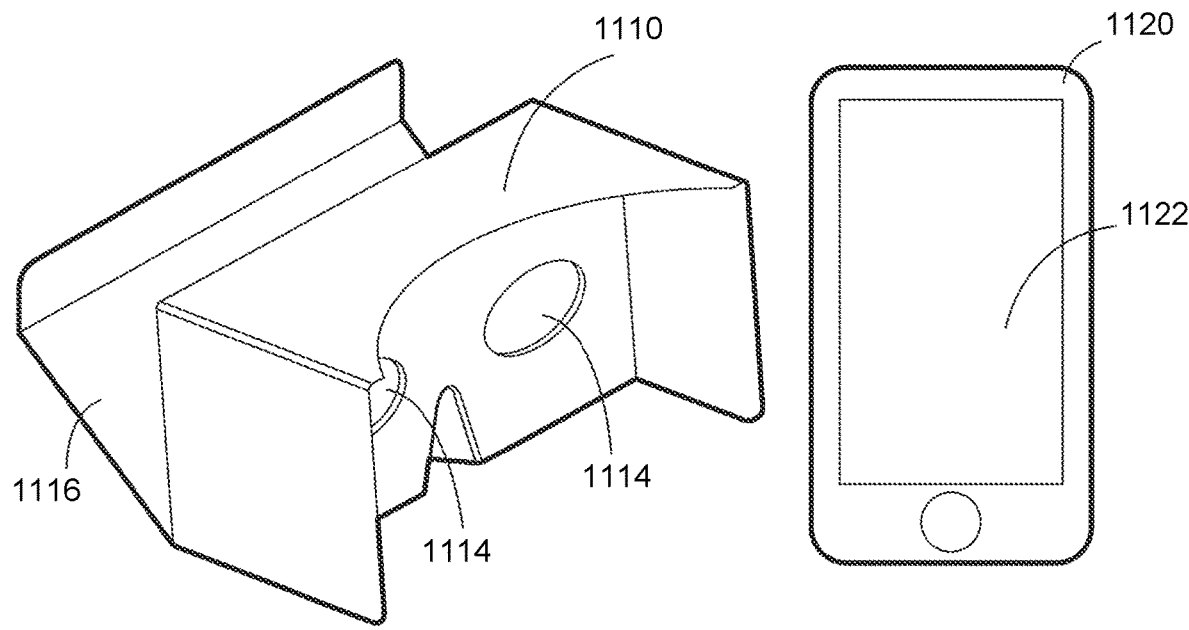
FIGS. 11A and 11B show another wearable augmented reality device with the device in partially assembled and assembled states, respectively.
Figure 11B:
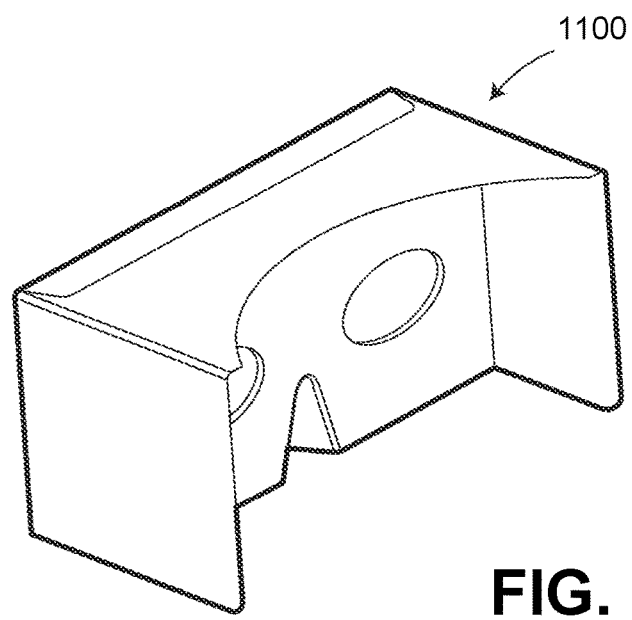

As best shown in FIG. 11A, an augmented reality device 1100 may be formed using a kit consisting of a frame 1110 and a smartphone 1120. The smartphone 1120 may be inserted into a compartment or cavity with a screen 1122 of the smartphone 1120 facing towards a pair of viewports 1114. A rear door 1116 of the frame 1110 may then be closed as shown in FIG. 11B. As such, the augmented reality device 1100, when assembled, includes a virtual-reality headset frame (the frame 1110) and the smartphone 1120 which mounted in the frame 1110. Notably, the augmented reality device 1100 may be worn or donned such as, for example, by holding it up to or mounting it against the face of a user. As such, the augmented reality device 1100 may be considered a wearable augmented reality device.

The frame 1110 may be made of a variety of materials such as, for example, cardboard or a suitable plastic such as, for example, ethylene-vinyl acetate (EVA). Further, it may be that plastic or glass lenses are provided at the viewports 1114. In a particular example, the frame 1110 may be a Google™ Cardboard frame or similar.

Conveniently, the augmented reality device 1100 may provide functionality similar to that as may be provided by the wearable augmented reality device 100 (FIG. 1). For example, the viewports 1114 may be analogous to the viewports 120 (FIG. 1) of the wearable augmented reality device 100 (FIG. 1). In another example, the screen 1122 may provide images similar to how images may be provided by the one or more displays 310 (FIG. 3) of the wearable augmented reality device 100. Further, the smartphone 1120 may include an accelerometer. Notably, where the augmented reality device 1100 is worn on the head of a user, the accelerometer of the smartphone 1120 may register movement of the user's head and, therefore, may provide functionality similar to the head tracker 320 (FIG. 3) of the wearable augmented reality device 100. For example, the user could wear the augmented reality device 1100 (FIG. 11) by pressing it against their face and holding it in place with their hands as they look through it and have movements of their head registered by such an accelerometer. In another example, the smartphone 1120 may include one or more cameras as may provide functionality similar to the image capture module 330 (FIG. 3) of the wearable augmented reality device 100. Additionally, smartphone 1120 is a computing device and may, therefore, serve a similar purpose and potentially provide similar functionality to the computing device 340 of the wearable augmented reality device 100.

Other augmented reality devices may also be employed in relation to the implementing the subject matter of the present application. For example, a smartphone or tablet (potentially without any accessories like the frame 1110) may be employed in manners similar to the smartphone 1120. More particularly, such a smartphone may be held by a viewer in front of their field of view. It may then be that the display of the smartphone displays a non-stereoscopic rendering of an augmented reality version of an environment and, in particular, of an augmented reality version of a portion of an environment corresponding to the portion of the real-world environment captured by a rear-facing camera of the smartphone. Conveniently, in this way, a smartphone may be employed as a viewport into an augmented reality environment.

In some embodiments, addition contextual information may be provided proximate or alongside renderings of replacement or further placards in augmented reality. For example, a graphical user interface may include overlaying one or more controls (such as, for example, button along an edge or side of a display) that may allow additional information or functionality related to the further placard to be selectively access. In a particular example, such controls may allow further information about a product or service featured in the replacement placard to be accessed. For example, a contextual video (related to the displayed placard) may be provided in such manners. Additionally or alternatively, functions such as, for example, enrolment in a featured product or service may be accessed via such controls.

The subject matter of the present application may be applied in a variety of contexts to a variety of ends. For example, it could be employed in a retail environment such as, for example, in a bank branch. Examples of how the subject matter of the present application may be applied in banking environments and/or in the context of banking will now be discussed. Selection of replacement placards may be based on information about a particular customer of the bank. For example, it may be that the user has authenticated to their mobile device and/or the mobile device has been previously authenticated to the remote server so as to allow a profile associated with a customer of the bank (e.g., the user of the mobile device) to be accessed. Such a profile may include information about the customer including, for example, language preferences, location, and the like. Such information may be considered configuration data and may be employed in the selection of placards in manner consistent with the above discussion. Such a profile may also include information about products and services in which a customer is already enrolled. Such information may be employed in selecting replacement placards such as, for example, to provide placards that relate to related to products or services to those in which the customer is already enrolled and/or to avoid providing placards related to products or services in which the customer is already enrolled.

Replacement placards may be customized based on information about a particular customer of the bank. For example, information about the customer like their, name, age, and/or location may be employed in selecting customizations and/or may be used to customize a replacement placard (e.g., by inserting their name).

In some embodiments, credit rating information may be accessed and used to select and/or customize replacement placards. For example, based on credit information, replacement placards about credit products for which the customer may qualify for may be favoured over those that the customer is unlikely to qualify for. Additionally or alternatively, replacement placards may be customized such as, for example, to include information about a particular interest rate for which the customer has been pre-qualified based on credit information in their profile.

Other customer information may also be employed. For example, where a customer has one or more accounts with the bank, information about transactions on those accounts may be used in selecting or customizing replacement placards. For example, replacement placards may be selected to provide information about products or services selected based on the type or nature of such transactions.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computing device comprising:
   a processor;
   a communications module coupled to the processor; and
   a memory module coupled to the processor and storing instructions that, when executed by the processor cause the computing device to:
   receive, from a mobile computing device via a network using the communications module, an indication of an image of at least a portion of a first placard captured in an environment;
   identify, based on the indication, in a data store storing information related to a plurality of placards, a placard matching the indication;
   retrieve, from the data store based on configuration data, an image of a further placard selected from amongst a family of placards related to the matching placard;
   modify the image of the further placard based on the configuration data; and
   send, to the mobile computing device via the network using the communications module, the image of the further placard as modified for use in presenting an augmented reality version of the environment in which the first placard is replaced by the image of the further placard as modified.

2. The computing device of claim 1 wherein modifying the image of the further placard based on the configuration data includes inserting text into the image of the further placard based on at least one of a location of the mobile computing device and a name of a user associated with the mobile computing device.

3. The computing device of claim 1 wherein the configuration data includes data of a profile associated with the mobile computing device.

4. The computing device of claim 1 wherein the further placard is selected based on at least one of a current date and a current time.

5. A computing device comprising:
   a processor;
   a communications module coupled to the processor; and
   a memory module coupled to the processor and storing instructions that, when executed by the processor, cause the computing device to:

receive, from a mobile computing device via a network using the communications module, an indication of an image of at least a portion of a first placard captured in an environment;

identify, based on the indication, in a data store storing information related to a plurality of placards, a placard matching the indication;

retrieve, from the data store based on configuration data, an image of a further placard selected from amongst a family of placards related to the matching placard; and send, to the mobile computing device via the network using the communications module, the image of the further placard for use in presenting an augmented reality version of the environment in which the first placard is replaced by the image of the further placard, wherein the configuration data includes data of a profile associated with the mobile computing device, the profile including a preferred language and wherein the first placard is in a first language other than the preferred language and wherein the further placard is in the preferred language.

6. The computing device of claim 5 wherein the further placard is a translation of the first placard including the same graphical elements and translated textual elements in the preferred language.

7. A computer-implemented method comprising:

receiving, from a mobile computing device via a network, an indication of an image of at least a portion of a first placard captured in an environment;

identifying, based on the indication, in a data store storing information related to a plurality of placards, a placard matching the indication;

retrieving, from the data store based on configuration data, an image of a further placard selected from amongst a family of placards related to the matching placard;

modifying the image of the further placard based on the configuration data; and sending, to the mobile computing device via the network, the image of the further placard as modified for use in presenting an augmented reality version of the environment in which the first placard is replaced by the image of the further placard as modified.

8. The method of claim 7 wherein modifying the image of the further placard based on the configuration data includes inserting text into the image of the further placard based on at least one of a location of the mobile computing device and a name of a user associated with the mobile computing device.

9. The method of claim 7 wherein the configuration data includes data of a profile associated with the mobile computing device.

10. The method of claim 7 wherein the further placard is selected based on at least one of a current date and a current time.

11. A computer-implemented method comprising:

receiving, from a mobile computing device via a network, an indication of an image of at least a portion of a first placard captured in an environment;

identifying, based on the indication, in a data store storing information related to a plurality of placards, a placard matching the indication;

retrieving, from the data store based on configuration data, an image of a further placard selected from amongst a family of placards related to the matching placard; and sending, to the mobile computing device via the network, the image of the further placard for use in presenting an augmented reality version of the environment in which the first placard is replaced by the further placard, wherein the configuration data includes data of a profile associated with the mobile computing device, the profile including a preferred language and wherein the first placard is in a first language other than the preferred language and wherein the further placard is in the preferred language.

12. The method of claim 11 wherein the further placard is a translation of the first placard including the same graphical elements and translated textual elements in the preferred language.

13. A non-transitory computer-readable medium storing instructions which, when executed by one or more processors of a computer system, cause the computer system to:

receive, from a mobile computing device via a network using a communications module, an indication of an image of at least a portion of a first placard captured in an environment;

identify, based on the indication, in a data store storing information related to a plurality of placards, a placard matching the indication;

retrieve, from the data store based on configuration data, an image of a further placard selected from amongst a family of placards related to the matching placard;

modify the image of the further placard based on the configuration data; and send, to the mobile computing device via the network using the communications module, the image of the further placard as modified for use in displaying an augmented reality version of the environment in which the first placard is replaced by the image of the further placard as modified.

14. The non-transitory computer-readable medium of claim 13 wherein modifying the image of the further placard based on the configuration data includes inserting text into the image of the further placard based on at least one of a location of the mobile computing device and a name of a user associated with the mobile computing device.

15. The non-transitory computer-readable medium of claim 13 wherein the configuration data includes data of a profile associated with the mobile computing device.

16. The non-transitory computer-readable medium of claim 13 wherein the further placard is selected further based on at least one of a current date and a current time.

17. A non-transitory computer-readable medium storing instructions which, when executed by one or more processors of a computer system, cause the computer system to:

receive, from a mobile computing device via a network using a communications module, an indication of an image of at least a portion of a first placard captured in an environment;

identify, based on the indication, in a data store storing information related to a plurality of placards, a placard matching the indication;

retrieve, from the data store based on configuration data, an image of a further placard selected from amongst a family of placards related to the matching placard; and send, to the mobile computing device via the network using the communications module, the image of the further placard for use in presenting an augmented reality version of the environment in which the first placard is replaced by the further placard, wherein the configuration data includes data of a profile associated with the mobile computing device, the profile including a preferred language and wherein the first placard is in a first language other than the preferred language and wherein the further placard is in the preferred language.

18. The non-transitory computer-readable medium of claim 17 wherein the further placard is a translation of the first placard including the same graphical elements and translated textual elements in the preferred language.

* * * * *